(12) United States Patent
Smith

(10) Patent No.: US 8,419,872 B2
(45) Date of Patent: Apr. 16, 2013

(54) ASPHALT-BASED REACTIVE POLYURETHANE ROOF MEMBRANE ADHESIVE

(75) Inventor: Jason Smith, Strongsville, OH (US)

(73) Assignee: Garland Indutries, Inc., Cleveland, OH (US)

( * ) Notice: Subject to any disclaimer, the term of this patent is extended or adjusted under 35 U.S.C. 154(b) by 198 days.

(21) Appl. No.: 12/850,873

(22) Filed: Aug. 5, 2010

(65) Prior Publication Data

US 2012/0031541 A1 Feb. 9, 2012

(51) Int. Cl.
| E04F 13/00 | (2006.01) |
| C09J 5/02 | (2006.01) |
| C09J 4/00 | (2006.01) |
| C09J 201/00 | (2006.01) |
| B29C 65/54 | (2006.01) |
| B32B 37/12 | (2006.01) |
| C08L 95/00 | (2006.01) |

(52) U.S. Cl.
USPC .... 156/71; 156/307.3; 156/307.7; 156/331.4; 156/337; 524/59; 106/273.1; 106/275; 106/277

(58) Field of Classification Search .................. 156/71, 156/307.1, 307.3, 307.7, 325, 331.4, 337; 524/59, 587, 705, 837; 106/273.1, 275, 277
See application file for complete search history.

(56) References Cited

U.S. PATENT DOCUMENTS

| 3,880,789 | A | | 4/1975 | Ishihara |
| 4,871,792 | A | * | 10/1989 | Lucke .............................. 524/59 |
| 5,008,311 | A | * | 4/1991 | Janoski ............................ 524/59 |
| 5,340,652 | A | * | 8/1994 | Sondhe et al. ................. 428/413 |
| 5,866,656 | A | | 2/1999 | Hung |
| 5,981,010 | A | | 11/1999 | Terry et al. |
| 6,579,924 | B2 | | 6/2003 | Georgeau et al. |
| 6,613,836 | B2 | | 9/2003 | Rumack |
| 6,679,018 | B2 | | 1/2004 | Georgeau et al. |
| 7,101,598 | B2 | | 9/2006 | Hubbard |
| 7,317,051 | B2 | | 1/2008 | Georgeau et al. |
| 2001/0051676 | A1 | | 12/2001 | Rajalingam |
| 2006/0089432 | A1 | | 4/2006 | Kawakami et al. |
| 2008/0182925 | A1 | * | 7/2008 | Wang et al. ..................... 524/66 |
| 2008/0210127 | A1 | * | 9/2008 | Bindschedler et al. ........ 106/275 |
| 2010/0048770 | A1 | * | 2/2010 | Burckhardt .................... 524/47 |

FOREIGN PATENT DOCUMENTS

| EP | 1462500 | 3/2003 |
| JP | 2004-161889 | 6/2004 |
| WO | WO 00/37534 | 6/2000 |

OTHER PUBLICATIONS

Cray Valley, Crayvallac® Rheology Modifiers Product Guide, (May 2006).
Cray Valley Coating Resins, Technical Data, Cravvallac Super, (Sep. 2004).
Great Lakes Polymer Additives Technical Information, Lowinox 22M46, One Great Lakes Blvd., P.O. Box 2200, West Lafayette, IN 47996-2200, (2006).
Harwick Standard Preparation/Product Information, Material Safety Data Sheet, (Apr. 14, 2006).
Gelest, Inc., Material Safety Data Sheet, (Oct. 2, 2003).
Strem Chemicals Material Safety Data Sheet, (Sep. 5, 1999).
FOMREZ Specialty Tin Catalysts for Polyurethane Applications, (Apr. 21, 2006).
Silquest A-151, Silquest A-171 and Silquest A-2171 Silane, Product Description, (Apr. 21, 2006).
MS Polymer Silyl, Silyl-Terminated Polyethers for Sealants and Adhesives of a new Generation, Kaneka Corporation, Liquid Polymers Division, 3-2-4, Nakanoshima, Kita-ku, Osaka 530-8288, Japan, (Mar. 2003).
Kaneko STPe Silyl-Terminated Polyether Durable Paintable Non Staining Easy to Handle, Non-Solvent Odorless, Non-isocyanate, Kaneka Texas Corporation, Liquid Polymers Division, 2 Northpoint Dr., Suite 200, Houston, TX, (2003).

* cited by examiner

*Primary Examiner* — Sing P Chan
(74) *Attorney, Agent, or Firm* — Fay Sharpe LLP

(57) ABSTRACT

A cold applied adhesive that includes a blend of polyurethane pre-polymer, petroleum liquid and additive. The weight percent of petroleum liquid in the blend is less than 50 weight percent. The weight percent of polyurethane pre-polymer in the blend is less than 50 weight percent.

32 Claims, No Drawings

ASPHALT-BASED REACTIVE POLYURETHANE ROOF MEMBRANE ADHESIVE

The present invention is directed to the production of a polyurethane pre-polymer that is blended with asphalt, bitumen, modified bitumen, and particularly to a cold applied blend of polyurethane pre-polymer and asphalt, bitumen, modified bitumen, and/or coal-tar, which then can be used as an interply adhesive.

BACKGROUND OF THE INVENTION

Despite their waterproofing properties, regular "hot mopped" roofing asphalts used by roofing contractors are typically brittle and cool very quickly. If the contractor does not unroll the membrane within 5 to 15 seconds after applying the hot asphalt to the roof surface, the asphalt will cool and thus will not properly adhere to the underside of the membrane when the membrane is placed over the cooled asphalt. Areas of the underside of the membrane that do not properly adhere to the asphalt are prone to delaminating and/or blistering over time.

Likewise, when hot asphalt compositions are to be used as an adhesive to bond together two or more layers of a roofing material, such roofing material layers must be applied to the hot asphalt composition in a short period of time or proper bonding of the roofing materials will not occur.

In view of the deficiencies associated with the use of hot mopped asphalt as an interply adhesive for roof membranes, there is a need for an improved or modified material that can be used to overcome the past problems with the use of "hot mopped" asphalt.

SUMMARY OF THE INVENTION

The present invention is directed to roof membrane adhesion products, more particularly to asphalt, modified asphalt, bitumen, modified bitumen, coal-tar, and/or modified coal tar products that are used to adhere roof membrane plys to one another and/or to a roof deck of a building or other type of structure, and even more particularly to asphalt, modified asphalt, bitumen, modified bitumen, coal-tar, and/or modified coal tar products that are blended with a polyurethane pre-polymer material to form a polyurethane material that can be used to adhere roof membrane plys to one another and/or to a roof deck of a building or other type of structure.

Because asphalt, modified asphalt, bitumen, modified bitumen, coal-tar, and/or modified coal tar products have the ability to take on the properties of the rubber blended into it, an asphalt-based polyurethane adhesive blend, a modified asphalt-based polyurethane adhesive blend, a bitumen-based polyurethane adhesive blend, a modified bitumen-based polyurethane adhesive blend, a coal tar-based polyurethane adhesive blend, and/or a modified coal tar-based polyurethane adhesive blend can be formed that has water repellent properties of asphalt, modified asphalt, bitumen, modified bitumen, coal-tar, and/or modified coal tar while having additional bonding strength that can be at least partially associated with the polyurethane. Such a novel blend can be tailor-made so as to increase the time period an installer can lay a roof membrane on the blend and still create a strong bond between the roof surface, the blend and the roof membrane. As such, an installer would not have to hurry and apply a ply of roof membrane (e.g., modified bitumen membrane, etc.) on the roof after the hot-melt blend of the present invention is applied to the surface of the roof. In addition, the blend of the present invention would not lose bond strength because of cooling as compared to hot adhesives, thus there is more opportunity to reposition the asphaltic membrane sheet before full curing takes place. The blend of the present invention can be used as a high strength interply adhesive for a built-up roof system as an alternative to the standard "hot mop" system, and/or as an inline adhesive for the application of single ply membranes (i.e., white membranes, solar panels, etc.) on asphalt, modified asphalt, bitumen, modified bitumen, coal-tar, and/or modified coal tar roofing during manufacturing. The blend of the present invention is different from asphalt-based cold applied adhesives that use styrene-butadiene-styrene rubber (SBS) or other kinds of rubber blended with asphalt cutback and fillers that form a rubberized film once dried. The problem with the drying mechanism adhesives that use SBS is that the adhesive is only as strong as the rubber that is used. While some low strength dispersive bonding occurs between the polymer structures of SBS containing adhesives, no further chemical reaction occurs to increase cross-link density and therefore increase the cohesive strength of the adhesive. The polyurethane in the blend of the present invention undergoes a chemical reaction with water that forms a cross-linked network that increases the bond strength of the adhesive blend.

In one non-limiting aspect of the present invention, the blend of petroleum liquid with the polyurethane pre-polymer can be used to form an interply adhesive for roofing materials and roofing systems. In one non-limiting embodiment, a polyurethane pre-polymer can be created using a blend of a variety of different primary polyol compound and diisocyanate combinations along with one or more additives, and that such blend can be tailor-made to produce very strong roofing products. The one or more additives, when used, can be selected to impart one or more desirable properties to the blend such as, but not limited to, tape-like tackiness, which would act as a mechanical clamp to hold the roof membranes together while the blend cures over time. The one or more additives in the novel blend of the present invention generally include catalyst and solvent. Additional additives can be included in the novel blend of the present invention; however, this is not required. Non-limiting examples of additional additives include adhesion enhancers, alumina trihydrate, biocides, cellulose fibers, calcium carbonate, chalk, clay, coloring agents, dolomite, fire retardants, fumed silica, metal flakes, mica, polymer, reinforced fibers, softening agent, surfactant, tackifying agent (e.g., pentaerytritol rosin esters, etc.), talc, UV resistance agents, and/or water. The content of the one or more additives in the novel blend is generally less than about 40 weight percent of the blend, an typically less than about 30 weight percent.

In still another and/or alternative non-limiting aspect of the present invention, a polyurethane pre-polymer is combined with asphalt, modified asphalt, bitumen, modified bitumen, coal-tar, and/or modified coal tar to form the novel blend of the present invention. For purposes of this invention, term "petroleum liquid" will be hereinafter used to generically refer to all types of asphalt, modified asphalt, bitumen, modified bitumen, asphalt cutback, coal-tar, modified coal tar, or any mixture thereof, unless a specific type of type of petroleum liquid is referenced. In one non-limiting embodiment of the invention, the polyurethane pre-polymer is a one-component, moisture-curing polyurethane based on acrylate and/or methacrylate polymers or copolymers. In one non-limiting embodiment of the invention, the moisture-curing polyurethane pre-polymer includes at least one diisocyanate compound and one or more primary polyol compounds. The diisocyanate compound can include aromatic, aliphatic and/ or cycloaliphatic diisocyanates having molecular weights of up to about 500; however, higher molecular weights can be used. Non-limiting examples of suitable aromatic diisocyanates include isomers of toluoylene diisocyanate (TDI), naphthalene 1,5-diisocyanate (NDI), naphthalene 1,4-diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyl-dimethylmethane diisocyanate, di- and tetraalkyl-diphenylmethane diisocyanates, 4,4'-dibenzyl diisocyanate, 1,3-phenylene diisocyanate and 1,4-phenylene diisocyanate. Non-limiting examples of cycloaliphatic diisocyanates include 4,4'-dicyclohexylmethane diisocyanate ($H_{12}MDI$), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6XDI$), 1-methyl-2,4-diisocyanato-cyclohexane, m- or p-tetramethylxylene diisocyanate (m-TMXDI, pTMXDI) and dimer fatty acid diisocyanate. Non-limiting examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}DI)_y$. In another non-limiting embodiment of the invention, the one or more diisocyanate compounds include methylene diphenyl diisocyanate (MDI) and/or toluene diisocyanate (TDI). The MDI and/or TDI included in the polyurethane pre-polymer can be pure MDI and/or TDI, and/or one or more isomers of MDI and/or TDI. In one non-limiting aspect of this embodiment, MDI and/or TDI constitute at least about 40 weight percent of the diisocyanate compounds in the polyurethane pre-polymer. In another non-limiting aspect of this embodiment, MDI and/or TDI constitute more than 50 weight percent of the diisocyanate compounds in the polyurethane pre-polymer. In still another non-limiting aspect of this embodiment, MDI and/or TDI constitute at least about 60 weight percent of the diisocyanate compounds in the polyurethane pre-polymer. In yet another non-limiting aspect of this embodiment, MDI and/or TDI constitute at least about 75 weight percent of the diisocyanate compounds in the polyurethane pre-polymer. In still yet another non-limiting aspect of this embodiment, MDI and/or TDI constitute at least about 90 weight percent of the diisocyanate compounds in the polyurethane pre-polymer. In a further non-limiting aspect of this embodiment, MDI and/or TDI constitute at least about 95 weight percent of the diisocyanate compounds in the polyurethane pre-polymer. In still another and/or alternative non-limiting embodiment of the invention, the one or more primary polyol compounds included in the polyurethane pre-polymer include a) polypropylene glycols or polybutylene glycols which can be used include di- and/or trifunctional polypropylene glycols with two or more hydroxyl groups per molecule in the molecular weight range from 400-20,000; b) polytetramethylene glycols (polybutylene glycols, poly(oxytetramethylene) glycol, poly-THF), wherein the molecular weight range of the polytetramethylene glycols are from 600-6,000 MW; c) low molecular weight polyols, alkylene diols (e.g., butanediol, hexanediol, octanediol, decanediol, dodecanediol, etc.); and/or d) polyester-polyols such as the crystalline or partly crystalline polyester-polyols which can be prepared by condensation of di- or tricarboxylic acids (e.g., adipic acid, sebacic acid, glutaric acid, azelaic acid, suberic acid, undecanedioic acid, dodecandioic acid, 3,3-dimethylglutaric acid, terephthalic acid, isophthalic acid, hexahydrophthalic acid, polycaprolactone, etc.), dimer fatty acid with low molecular weight diols or triols (e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, trimethylolpropane, etc.). Non-limiting examples of polyols that can be used include polypropylene glycols (Diol) [e.g., PLURACOL by BASF, etc.]; propylene oxide adduct of glycerine (Triol) [e.g., PLURACOL by BASF, etc.], polyether polyols (Diol & Triol) [e.g., ARCOL Polyol by Bayer, ACCLAIM Polyol by Bayer, ULTRACEL by Bayer, etc.]; polypropylene oxide-based polyol (Diol) [e.g., MULTRANOL by Bayer, etc.]; 1,12-octadecanediol; 1,2,3-propanetriol; 1,2,6-hexanetriol; 1,2-ethanediol; 1,3-butanediol; 1,4-benzenediol; 1,9-nonanediol; 2,2,4,4-tetramethyl-1,3-cyclobutanediol; 2,2,4-trimethyl-1,3-pentanediol; 2,2-bis(hydroxymethyl)-1,3-propanediol; 2,2-diethyl-1,3-propanediol; 2,2-dimethyl-1,3-butanediol; 2,3-butanediol; 2,3-naphthalenediol; 2,4-hexadiyne-1,6-diol; 2,7-dimethyl-3,5-octadiyne-2,7-diol; 2-butyl-2-ethyl-1,3-propanediol; 2-ethyl-2-methyl-1,3-propanediol; 2-methyl-2-propyl-1,3-propanediol; 3-chloro-1,2-propanediol; 3-methyl-1,3-butanediol; 3-methyl-2,4-pentanediol; 9-octadecene-1,12-diol; actol 21-56 diol; actol 22-110 diol; actol 23-95 diol; actol 32-160 triol; actol 33-46 triol; butanediol; butanetriol; butenediol; butynediol; dimethyl octanediol; and dimethylhexanediol. Generally, the polyols are petroleum based polyols. In one non-limiting aspect of this embodiment, two different primary polyol compounds are included in the polyurethane pre-polymer. In one non-limiting formulation, the primary polyol compounds include a first primary polyol compound that is a diol or triol polyol having a molecular weight that is at least 300 and up to 5000 and a second primary polyol compound that is a diol or triol having a molecular weight of at least 150 and up to 7000. Generally the first primary polyol compound is a diol and the second primary polyol compound is a triol. The weight ratio of the lower weight primary polyol compound to the higher weight primary polyol compound is about 1-5:1, typically about 1.1-4:1, and more typically about 1.2-3.5:1. It has been found that when the lower weight primary polyol compound is equal to or greater than the weight percentage of the higher weight primary polyol compound, improved adhesion of the blend is observed. In another and/or alternative non-limiting aspect of this embodiment, the one or more primary polyol compounds included in the polyurethane pre-polymer includes diol propylene glycol (1400-2500 MW) and/or triol propylene glycol (3500-6000 MW). In still another non-limiting aspect of this embodiment, the diol propylene glycol (1400-2500 MW) and/or triol propylene glycol (3500-6000 MW) constitute at least about 40 weight percent of the one or more primary polyol compounds in the polyurethane pre-polymer. In yet another non-limiting aspect of this embodiment, the diol propylene glycol (1400-2500 MW) and/or triol propylene glycol (3500-6000 MW) constitute more than 50 weight percent of the one or more primary polyol compounds in the polyurethane pre-polymer. In still another non-limiting aspect of this embodiment, the diol propylene glycol (1400-2500 MW) and/or triol propylene glycol (3500-6000 MW) constitute at least about 60 weight percent of the one or more primary polyol compounds in the polyurethane pre-polymer. In still yet another non-limiting aspect of this embodiment, the diol propylene glycol (1400-2500 MW) and/or triol propylene glycol (3500-6000 MW) constitute at least about 75 weight percent of the one or more primary polyol compounds in the polyurethane pre-polymer. In a further non-limiting aspect of this embodiment, the diol propylene glycol (1400-2500 MW) and/or triol propylene glycol (3500-6000 MW) constitute at least about 90 weight percent of the one or more primary polyol compounds in the polyurethane pre-polymer. In still a further non-limiting aspect of this embodiment, the diol propylene glycol (1400-2500 MW) and/or triol propylene glycol (3500-6000 MW) constitute at least about 95 weight percent of the one or more primary polyol compounds in the polyurethane pre-polymer. In another non-limiting aspect of this embodiment, the one or more primary polyol compounds included in the polyurethane pre-polymer include both diol propylene glycol (1400-2500 MW) and triol propylene glycol (3500-6000 MW). In still another non-limiting aspect of this embodiment, the one or more primary polyol compounds included in the polyurethane pre-polymer include both diol propylene glycol (1400-2500 MW) and triol propylene glycol (3500-6000 MW) at a weight ratio of diol propylene glycol to triol propylene glycol of about 1-5:1, typically about 1.5-3:1, and more typically about 1.8-2.2:1. In yet another non-limiting embodiment of the invention, the weight ratio of the at least one diisocyanate compound to the one or more primary polyol compounds in the polyurethane pre-polymer is about 0.05-0.8:1, typically about 0.1-0.6:1, more typically about 0.12-0.5:1, still more typically about 0.12-0.4:1, yet more typically about 0.15-0.35:1, and even yet more typically about 0.2-0.3:1. A ratio of greater than 5:1 has been found to cause the cross-link density to decrease, and eventually the tensile strength of the cured blend is not affected by the triol. A ratio of less than 1:1 (by weight) increases the chance of the polymer approaching or exceeding its gel point. In one non-limiting aspect of this embodiment, the polyurethane pre-polymer includes at least about 5 weight percent of at least one diisocyanate compound and more than 50 weight percent of one or more primary polyol compounds. In another non-limiting aspect of this embodiment, the polyurethane pre-polymer includes about 10-30 weight percent of at least one diisocyanate compound 60-90 weight percent of one or more primary polyol compounds. In still another non-limiting aspect of this embodiment, the polyurethane pre-polymer includes about 12-25 weight percent of at least one diisocyanate compound 65-88 weight percent of one or more primary polyol compounds. In yet another non-limiting aspect of this embodiment, the polyurethane pre-polymer includes about 15-20 weight percent of at least one diisocyanate compound 70-85 weight percent of one or more primary polyol compounds. In still yet another non-limiting aspect of this embodiment, the polyurethane pre-polymer includes about 18-20 weight percent of at least one diisocyanate compound 74-82 weight percent of one or more primary polyol compounds.

In yet another and/or alternative non-limiting aspect of the present invention, the polyurethane pre-polymer includes one or more chain extenders. The chain extender is generally a low molecular weight hydroxyl and amine terminated compound that positively affects the polymer morphology of polyurethane fibers. In one non-limiting embodiment of the invention, the amount of chain extender present in the polyurethane pre-polymer is at least about 0.5 weight percent, typically about 0.5-10 weight percent, more typically about 1-8 weight percent, even more typically about 1.5-6 weight percent, still more typically about 2-5 weight percent, and still yet more typically about 2.5-4 weight percent. In another and/or alternative non-limiting embodiment of the invention, the one or more chain extenders include a glycol chain extender. In one non-limiting formulation, at least about 40 weight percent of the chain extender includes a glycol chain extender. In another non-limiting formulation, more than 50 weight percent of the chain extender includes a glycol chain extender. In still another non-limiting formulation, at least about 75 weight percent of the chain extender includes a glycol chain extender. In yet another non-limiting formulation, at least about 90 weight percent of the chain extender includes a glycol chain extender. In still yet another non-limiting formulation, at least about 95 weight percent of the chain extender includes a glycol chain extender. In another non-limiting formulation, at least about 50 weight percent of the glycol chain extender includes dipropylene glycol chain extender. In still another non-limiting formulation, at least about 60 weight percent of the glycol chain extender includes dipropylene glycol chain extender. In yet another non-limiting formulation, at least about 70 weight percent of the glycol chain extender includes dipropylene glycol chain extender. In yet another non-limiting formulation, at least about 90 weight percent of the glycol chain extender includes dipropylene glycol chain extender. In still yet another non-limiting formulation, at least about 95 weight percent of the glycol chain extender includes dipropylene glycol chain extender. The content of the one or more diisocyanate compounds in the polyurethane pre-polymer is greater than the content of the one or more chain extenders in the polyurethane pre-polymer. In still another non-limiting embodiment of the invention, the molecular weight of the chain extender is less than the molecular weight of any of the primary polyol compounds contained in the polyurethane pre-polymer. In one aspect of this embodiment, the molecular weight of the chain extender is at least about 50 and less than about 1200, typically about 60-1000, more typically about 60-600, and even more typically about 75-450. In yet another and/or alternative non-limiting embodiment of the invention, the weight ratio of the one or more diisocyanate compounds to one or more chain extenders in the polyurethane pre-polymer is about 1.5-20:1, typically about 2-15:1, more typically about 3-10:1; and still more typically about 4-8:1.

In still yet another and/or alternative non-limiting aspect of the present invention, the polyurethane pre-polymer that is included in the blend of the present invention as the following general formulations:

Formula A

| | |
|---|---|
| Diisocyanate and/or polyisocyanate compound | 5-45 wt. % |
| Primary polyol compound | 50-95 wt. % |
| Chain extender | 0-15 wt. % |

Formula B

| | |
|---|---|
| Diisocyanate and/or polyisocyanate compound | 10-30 wt. % |
| Primary polyol compound | 55-90 wt. % |
| Chain extender | 0-12 wt. % |

Formula C

| | |
|---|---|
| Diisocyanate and/or polyisocyanate compound | 15-25 wt. % |
| Primary polyol compound | 60-84.9 wt. % |
| Chain extender | 0.1-10 wt. % |

Formula D

| | |
|---|---|
| Diisocyanate and/or polyisocyanate compound (at least 60% MDI and/or TDI) | 10-30 wt. % |
| Primary polyol compound (at least 60% propylene glycol) | 55-90 wt. % |
| Chain extender (at least 60% dipropylene glycol chain extender) | 0-12 wt. % |

Formula E

| | |
|---|---|
| Diisocyanate and/or polyisocyanate compound (at least 60% MDI and/or TDI) | 15-25 wt. % |
| Primary polyol compound (at least 60% propylene glycol) | 60-84.9 wt. % |
| Chain extender (at least 60% dipropylene glycol chain extender) | 0.1-10 wt. % |

Formula F

| | |
|---|---|
| Diisocyanate and/or polyisocyanate compound (at least 60% MDI and/or TDI) | 10-30 wt. % |
| Propylene Glycol Diol (1800-2200 MW) | 40-70 wt. % |
| Propylene Glycol Triol (4600-5000 MW) | 20-35 wt. % |
| Chain extender (at least 60% dipropylene glycol chain extender) | 0.1-10 wt. % |

Formula G

| | |
|---|---|
| Diisocyanate and/or polyisocyanate compound (at least 60% MDI and/or TDI) | 15-20 wt. % |
| Propylene Glycol Diol (1800-2200 MW) | 44-60 wt. % |
| Propylene Glycol Triol (4600-5000 MW) | 25-30 wt. % |
| Chain extender (at least 80% dipropylene glycol chain extender) | 2-5 wt. % |

In another and/or alternative non-limiting aspect of the present invention, the polyurethane pre-polymer that is included in the blend of the present invention constitutes less than 50 weight percent of the blend of the present invention. When the weight percentage of the polyurethane pre-polymer exceeds 50 weight percent in a blend, no further advantage as to bond strength has been found to occur when bonding to other materials that are formed of large amounts (more than 30 wt. %) of petroleum liquid. As such, when the blend of the present invention is used to bond together two asphaltic-based roof membranes, the bond strength of the blend is not further enhanced when the polyurethane pre-polymer exceeds 50 weight percent in a blend. Generally the polyurethane pre-polymer constitutes no more than about 45 weight percent of the blend. Typically the polyurethane pre-polymer constitutes no more than about 40 weight percent of the blend. In one non-limiting formulation, the polyurethane pre-polymer constitutes about 15-45 weight percent of the blend. In another non-limiting formulation, the polyurethane pre-polymer constitutes about 20-40 weight percent of the blend. In still another non-limiting formulation, the polyurethane pre-polymer constitutes about 25-38 weight percent of the blend.

In still another and/or alternative non-limiting aspect of the present invention, the petroleum liquid in the blend of the present invention constitutes less than 50 weight percent of the blend of the present invention. When the weight percentage of the petroleum liquid exceeds 50 weight percent in a blend, a reduction of peel strength of the blend has been found to occur when bonding to other materials that are formed of large amounts (more than 30 wt. %) of petroleum liquid. When the polyurethane pre-polymer exceeds 50 weight percent of the blend, the peel strength of the blend is not noticeably increased. The weight ratio of the petroleum liquid to the polyurethane pre-polymer in the blend is generally about 0.4-2:1, typically about 0.5-1.8:1, more typically about 0.6-1.6:1. In one non-limiting formulation, the weight ratio of the petroleum liquid to the polyurethane pre-polymer in the blend is 1.01-1.6:1. In one non-limiting embodiment of the invention, the petroleum liquid includes an asphalt. In one aspect of this embodiment, the asphalt has a softening point of at least about 90° F. and less than about 200° F., typically less than about 180° F., more typically less than about 150° F., and yet even more typically about 100-140° F. The penetration value of the asphalt is about 20-80, typically about 40-70, and more typically about 50-60. It has been found that petroleum liquid having softening points that exceed about 200° F. results in a loss of bonding strength of the blend. Also, if the penetration values of the petroleum liquid are less than 20 or greater than 80, a reduction in the bonding strength of the blend also occurs. One non-limiting petroleum liquid that can be used is PG 64/22 asphalt.

Non-limiting examples of the blend of the present invention are set forth below:

EXAMPLE 1

| | |
|---|---|
| Polyurethane Pre-polymer | 10-49 wt. % |
| Petroleum liquid | 10-49 wt. % |
| Additive | 2-55 wt. % |

EXAMPLE 2

| | |
|---|---|
| Polyurethane Pre-polymer | 15-45 wt. % |
| Petroleum liquid | 15-48 wt. % |
| Additive | 7-50 wt. % |

EXAMPLE 3

| | |
|---|---|
| Polyurethane Pre-polymer | 20-40 wt. % |
| Petroleum liquid | 25-45 wt. % |
| Additive | 15-50 wt. % |

EXAMPLE 4

| Polyurethane Pre-polymer | 10-49 wt. % |
|---|---|
| Petroleum liquid | 10-49 wt. % |
| CaCO$_3$ | 0-30 wt. % |
| Clay | 0-10 wt. % |
| Solvent | 0-30 wt. % |
| Catalyst | 0.01-2 wt. % |

EXAMPLE 5

| Polyurethane Pre-polymer | 15-45 wt. % |
|---|---|
| Petroleum liquid | 15-48 wt. % |
| CaCO$_3$ | 0.5-30 wt. % |
| Clay | 0-5 wt. % |
| Solvent | 0.5-25 wt. % |
| Catalyst | 0.01-1.5 wt. % |

EXAMPLE 6

| Polyurethane Pre-polymer | 20-40 wt. % |
|---|---|
| Petroleum liquid | 25-45 wt. % |
| CaCO$_3$ | 5-25 wt. % |
| Clay | 0.1-4 wt. % |
| Solvent | 1-25 wt. % |
| Catalyst | 0.01-1 wt. % |

One non-limiting object of the present invention is the provision of a novel blend of petroleum liquid and polyurethane pre-polymer, which blend can be used as a cold applied adhesive.

Another and/or alternative non-limiting object of the present invention is the provision of a novel blend of petroleum liquid and polyurethane pre-polymer, which blend can be used to adhere roof membrane plys to one another and/or to a roof deck of a building or other type of structure.

These and other advantages will become apparent to those skilled in the art upon the reading and following of this description.

DESCRIPTION OF NON-LIMITING EMBODIMENTS

The present invention is directed to roof membrane adhesion products that are formed of a novel combination of petroleum liquid, a novel polyurethane pre-polymer, and one or more additives to form a cold applied adhesive composition that can be used to adhere roof membrane plys to one another and/or to a roof deck of a building or other type of structure.

The novel polyurethane pre-polymer includes a) diisocyanate and/or polyisocyanate compound, b) primary polyol compound, and optionally c) chain extender. The diisocyanate and/or polyisocyanate compound generally is or includes MDI and/or TDI. The primary polyol compound is generally is formed of two different polyols that have different molecular weights. The lower weight primary polyol compound has a molecular weight that is less than 2100-3000 and the higher weight primary polyol compound has a molecular weight of at least 3200-4200. One non-limiting lower weight primary polyol compound that can be used is a 1900-2100 MW diol of dipropylene glycol that is commercially available from Bayer as PPG 2000. One non-limiting higher weight primary polyol compound that can be used is a 4700-4900 MW triol of dipropylene glycol that is commercially available from Bayer as Multranol 3900. The weight percentage of the lower weight primary polyol compound in the polyurethane pre-polymer is the same as or greater than the weight percentage of the higher weight primary polyol compound. The chain extender, when used, can be a low molecular weight diol and/or triol chain extender; however, this is not required. Generally the molecular weight of the chain extender is about 300-500. One non-limiting chain extender that can be used is a dipropylene glycol chain extender of about 400 MW. The weight percent of the novel polyurethane pre-polymer in the blend of the present invention is less than 50 weight percent of the blend.

The petroleum liquid is generally an asphalt; however, other types of petroleum liquid can be alternatively or additionally used. One non-limiting asphalt is 64/22 grade asphalt that has a softening point of about 120° F. and a penetration value of about 50-60. The weight percent of the petroleum liquid in the blend of the present invention is less than 50 weight percent of the blend.

The one or more additives in the novel blend of the present invention generally include catalyst and solvent. One non-limiting catalyst that can be used includes 1,3,5-(tris(3-dimethylamino)propyl)-hexahydro-s-triazine, 1,8-diazabicyclo[5,4,0]undecene-7 (DBU), 1,4-diazabicyclo[2,2,2]octane, tetramethylbutanediamine (TMBDA), benzyldimethylamine (BDMA), bis-(2-dimethylaminoethyl)ether, dibutyltin dilaurate, dibutyltin oxide, dimethylcyclohexylamine (DMCHA), dimethylethanolamine (DMEA), dioctyltin mercaptide, N-ethylmorpholine, N-(3-dimethylaminopropyl)-N,N-diisopropanolamine, N'-(3-(dimethylamino)propyl)-N,N-dimethyl-1,3-propanediamine, N,N,N'-trimethyl-N'-hydroxyethyl-bis(aminoethyl)ether, pentamethyldiethylenetriamine (PMDETA), pentamethyldipropylenetriamine, phenylmercuric neodeconate, tin mercaptides, triethylamine (TEA), triethylenediamine (TEDA). One catalyst that is generally used is dibutyltin dilaurate. The solvent is generally mineral spirits, aromatic solvents, and/or VOC-exempt solvent; however, other or additional solvents can be used. One type of non-limiting solvent that is generally used is mineral spirits and aromatic solvents. The weigh percent ratio of petroleum liquid to solvent is about 1.01-4:1, typically about 1.1-3:1, more typically about 1.2-2.5:1, even more typically about 1.3-2:1, and still even more typically about 1.4-1.8:1. A portion of the solvent can be added to the petroleum liquid prior to the petroleum liquid being added to the polyurethane pre-polymer; however, this is not required. Additional additives can be included in the novel blend of the present invention; however, this is not required. Non-limiting examples of additional additives include adhesion enhancers, alumina trihydrate, biocides, cellulose fibers, calcium carbonate, chalk, clay, coloring agents, dolomite, fire retardants, fumed silica, metal flakes, mica, polymer, reinforced fibers, softening agent, surfactant, tackifying agent, talc, UV resistance agents, and/or water. The content of the one or more additives in the novel blend is generally less than about 50 weight percent of the blend.

One non-limiting specific example of the novel polyurethane pre-polymer is as follows:

Formula I

| | |
|---|---|
| TDI and/or MDI | 15-20 wt. % |
| Propylene Glycol Diol (2000 MW) | 45-60 wt. % |
| Propylene Glycol Triol (4800 MW) | 25-30 wt. % |
| Dipropylene glycol chain extender | 2-5 wt. % |

Two non-limiting examples of the novel blend of the present invention is as follows:

Formula II

| | |
|---|---|
| Polyurethane Pre-polymer (Formula I) | 28 wt. % |
| Asphalt (64/22 Grade Asphalt) | 33.6 wt. % |
| CaCO$_3$ | 18 wt. % |
| Clay | 1 wt. % |
| Solvent (mineral spirits and/or aromatic solvents) | 19.4 wt. % |
| Catalyst | <1 wt. % |

Formula III

| | |
|---|---|
| Polyurethane Pre-polymer (Formula I) | 37 wt. % |
| Asphalt (64/22 Grade Asphalt) | 24.5 wt. % |
| CaCO$_3$ | 18 wt. % |
| Clay | 1 wt. % |
| Solvent (mineral spirits and/or aromatic solvents) | 16.5 wt. % |
| Catalyst | <1 wt. % |

A comparison of the bonding strength of the novel blend of the present invention to a conventional rubber-based cold applied adhesive (Control) is set forth below in Table 1.

TABLE 1

| Adhesive Formulation | 10 Days Average Peel Strength (pli) | 28 Days Average Peel Strength (pli) |
|---|---|---|
| Control | 2.9 | 5.6 |
| Formula II | 5.7 | 12.1 |
| Formula III | 9.8 | 12.1 |

The adhesives in Table 1 were used to bond two pieces of asphaltic roofing membrane together. At 10 days and 28 days, the pieces of asphaltic roofing membrane were separated at a constant speed, and the average strength (lbs. per lineal inch [pli]) was measured. As is evident from Table I, the formulations that contain the novel polyurethane pre-polymer of the present invention had increased bonding strength as compared to the control formulation. The results in Table 1 also reveal that an increase in the amount of polyurethane pre-polymer in the formulation creates higher bonding strengths earlier in the curing process; however, after the curing has been substantially completed in about 28 days, the usual number of days of set time recommended for cold applied adhesives, the bonding strengths of the two formulations of the present invention leveled off and were substantially the same.

The polyurethane pre-polymer is generally reacted with so that it has a % NCO of about 1-6%, typically about 2-4%, more typically about 2-3%, and even more typically about 2.5%.

For Formulas II and III used in Table 1, the weight ratio of the propylene Glycol (2000 MW) Diol to the propylene Glycol (4800 MW) Triol in Formula I for the polyurethane pre-polymer was about 2:1. In addition, TDI was primarily used in Formula I for the polyurethane pre-polymer for Formulas II and III used in Table 1.

Testing of iterations of the blend of the present invention has resulted in the formation of cold applied adhesives that achieve higher bonding strengths in shorter periods of time as compared to conventional rubber-based cold applied adhesives, and also superior bond strength as compared to conventional rubber-based cold applied adhesives.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A method of adhering an interply roof membrane to another roof membrane or to a roof deck substrate comprising:
   a) applying a liquid cold applied adhesive to said roof membrane or said roof deck, said cold applied adhesive comprising a blend of a) polyurethane pre-polymer, b) petroleum liquid including one or more compounds selected from the group consisting of asphalt, modified asphalt, bitumen, modified bitumen, coal-tar, and modified coal tar; c) solvent, and d) additive, said additive including one or more compounds selected from the group consisting of adhesion enhancers, alumina trihydrate, biocides, cellulose fibers, calcium carbonate, chalk, clay, coloring agents, dolomite, fire retardants, fumed silica, metal flakes, mica, polymer, reinforced fibers, softening agent, surfactant, tackifying agent, talc, UV resistance agents, and water, and wherein a weight percent of said petroleum liquid in said blend is less than 50 weight percent, and wherein a weight percent of said polyurethane pre-polymer in said blend is less than 50 weight percent, and wherein a weight percent of said additive in said blend is less than 50 weight percent, and wherein a weight percent ratio of said petroleum liquid to said solvent is about 1.01-4:1, and wherein a weight ratio of said petroleum liquid to said polyurethane pre-polymer is about 0.4-2:1; and,
   b) applying said interply roof membrane to said roof membrane or said roof deck, said interply of roof membrane applied to said roof membrane or said roof deck prior to a complete curing of said polyurethane pre-polymer in said liquid cold applied adhesive.

2. The method as defined in claim 1, wherein said interply roof membrane is a white reflective membrane, a flexible solar panel, or a modified bitumen roof membrane.

3. The method as defined in claim 2, wherein said polyurethane pre-polymer includes a) diisocyanate, polyisocyanate, or mixtures thereof, b) at least one primary polyol compound selected from the group consisting of polyester-polyol, polypropylene glycol, polybutylene glycol, olefinically unsaturated monomers, and alkylene diols, and c) chain extender, said primary polyol compound constituting at least 50 weight percent of said polyurethane pre-polymer, said diisocyanate, polyisocyanate, or mixtures thereof constituting less than 50 weight percent of said polyurethane pre-polymer.

4. The method as defined in claim 3, wherein said primary polyol compound in said polyurethane pre-polymer includes a first and second primary polyol compound, said first primary polyol compound having a molecular weight of less than 3000, said second primary polyol compound having a molecular weight of greater than 3200, a weight ratio of said first primary polyol compound to said second primary polyol compound in said polyurethane pre-polymer is about 1-5:1.

5. The method as defined in claim 4, wherein said polyurethane pre-polymer includes by weight percent:

| | |
|---|---|
| Diisocyanate, polyisocyanate compound, and combinations thereof | 5-45 wt. % |
| Primary polyol compound | 50-95 wt. % |
| Chain extender | 0.1-15 wt. %. |

6. The method as defined in claim 5, wherein said polyurethane pre-polymer includes by weight percent:

| | |
|---|---|
| TDI, MDI, and combinations thereof | 15-20 wt. % |
| Propylene Glycol Diol 1800-2200 MW | 45-60 wt. % |
| Propylene Glycol Triol 4600-5000 MW | 25-30 wt. % |
| Dipropylene glycol chain extender | 2-5 wt. %. |

7. The method as defined in claim 6, wherein said blend includes by weight percent:

| | |
|---|---|
| Polyurethane Pre-polymer | 20-40 wt. % |
| Petroleum liquid | 25-45 wt. % |
| CaCO$_3$ | 5-25 wt. % |
| Clay | 0.1-4 wt. % |
| Solvent | 1-25 wt. % |
| Catalyst | 0.01-1 wt. %. |

8. The method as defined in claim 7, wherein said weight percent ratio of said petroleum liquid to said solvent is about 1.4-1.8:1, and wherein a weight ratio of said petroleum liquid to said polyurethane pre-polymer is about 1.01-1.6:1.

9. The method as defined in claim 8, wherein said blend includes by weight percent:

| | |
|---|---|
| Polyurethane Pre-polymer | 37 wt. % |
| Asphalt 64/22 Grade Asphalt | 24.5 wt. % |
| CaCO$_3$ | 18 wt. % |
| Clay | 1 wt. % |
| Solvent mineral spirits, aromatic solvents, and combinations thereof | 16.5 wt. % |
| Catalyst | <1 wt. %. |

10. The method as defined in claim 5, wherein said blend includes by weight percent:

| | |
|---|---|
| Polyurethane Pre-polymer | 20-40 wt. % |
| Petroleum liquid | 25-45 wt. % |
| CaCO$_3$ | 5-25 wt. % |
| Clay | 0.1-4 wt. % |
| Solvent | 1-25 wt. % |
| Catalyst | 0.01-1 wt. %. |

11. The method as defined in claim 10, wherein said weight percent ratio of said petroleum liquid to said solvent is about 1.4-1.8:1, and wherein a weight ratio of said petroleum liquid to said polyurethane pre-polymer is about 1.01-1.6:1.

12. The method as defined in claim 11, wherein said blend includes by weight percent:

| | |
|---|---|
| Polyurethane Pre-polymer | 37 wt. % |
| Asphalt 64/22 Grade Asphalt | 24.5 wt. % |
| CaCO$_3$ | 18 wt. % |
| Clay | 1 wt. % |
| Solvent mineral spirits, aromatic solvents, and combinations thereof | 16.5 wt. % |
| Catalyst | <1 wt. %. |

13. The method as defined in claim 1, wherein said interply roof membrane is secured to said roof membrane at a manufacturing site and rolled into a roll of connected membrane.

14. The method as defined in claim 13, wherein said interply roof membrane and said roof membrane are conveyed through at least one set of pressing rollers, at least one drum roller, or combinations thereof to press said interply roof membrane to said roof membrane prior to the complete curing of said polyurethane pre-polymer in said liquid cold applied adhesive.

15. The method as defined in claim 1, wherein said polyurethane pre-polymer includes a) diisocyanate, polyisocyanate, or mixtures thereof, b) at least one primary polyol compound selected from the group consisting of polyester-polyol, polypropylene glycol, polybutylene glycol, olefinically unsaturated monomers, and alkylene diols, and c) chain extender, said primary polyol compound constituting at least 50 weight percent of said polyurethane pre-polymer, said diisocyanate, polyisocyanate, or mixtures thereof constituting less than 50 weight percent of said polyurethane pre-polymer.

16. The method as defined in claim 1, wherein said primary polyol compound in said polyurethane pre-polymer includes a first and second primary polyol compound, said first primary polyol compound having a molecular weight of less than 3000, said second primary polyol compound having a molecular weight of greater than 3200, a weight ratio of said first primary polyol compound to said second primary polyol compound in said polyurethane pre-polymer is about 1-5:1.

17. The method as defined in claim 1, wherein said polyurethane pre-polymer includes by weight percent:

| | |
|---|---|
| Diisocyanate, | 5-45 wt. % |
| polyisocyanate compound, | |
| and combinations thereof | |
| Primary polyol compound | 50-95 wt. % |
| Chain extender | 0.1-15 wt. %. |

18. The method as defined in claim 17, wherein said blend includes by weight percent:

| | |
|---|---|
| Polyurethane Pre-polymer | 10-49 wt. % |
| Petroleum liquid | 10-49 wt. % |
| Additive | 2-55 wt. %. |

19. The method as defined in claim 17, wherein said blend includes by weight percent:

| | |
|---|---|
| Polyurethane Pre-polymer | 15-45 wt. % |
| Petroleum liquid | 15-48 wt. % |
| Additive | 7-50 wt. %. |

20. The method as defined in claim 17, wherein said blend includes by weight percent:

| | |
|---|---|
| Polyurethane Pre-polymer | 20-40 wt. % |
| Petroleum liquid | 25-45 wt. % |
| Additive | 15-50 wt. %. |

21. The method as defined in claim 17, wherein said blend includes by weight percent:

| | |
|---|---|
| Polyurethane Pre-polymer | 10-49 wt. % |
| Petroleum liquid | 10-49 wt. % |
| CaCO$_3$ | 0-30 wt. % |
| Clay | 0-10 wt. % |
| Solvent | 0-30 wt. % |
| Catalyst | 0.01-2 wt. %. |

22. The method as defined in claim 17, wherein said blend includes by weight percent:

| | |
|---|---|
| Polyurethane Pre-polymer | 15-45 wt. % |
| Petroleum liquid | 15-48 wt. % |
| CaCO$_3$ | 0.5-30 wt. % |
| Clay | 0-5 wt. % |
| Solvent | 0.5-25 wt. % |
| Catalyst | 0.01-1.5 wt. %. |

23. The method as defined in claim 17, wherein said blend includes by weight percent:

| | |
|---|---|
| Polyurethane Pre-polymer | 20-40 wt. % |
| Petroleum liquid | 25-45 wt. % |
| CaCO$_3$ | 5-25 wt. % |
| Clay | 0.1-4 wt. % |
| Solvent | 1-25 wt. % |
| Catalyst | 0.01-1 wt. %. |

24. The method as defined in claim 17, wherein said blend includes by weight percent:

| | |
|---|---|
| Polyurethane Pre-polymer | 28 wt. % |
| Asphalt | 33.6 wt. % |
| 64/22 Grade Asphalt | |
| CaCO$_3$ | 18 wt. % |
| Clay | 1 wt. % |
| Solvent | 19.4 wt. % |
| mineral spirits, | |
| aromatic solvents, | |
| and combinations thereof | |
| Catalyst | <1 wt. %. |

25. The method as defined in claim 17, wherein said blend includes by weight percent:

| | |
|---|---|
| Polyurethane Pre-polymer | 37 wt. % |
| Asphalt | 24.5 wt. % |
| 64/22 Grade Asphalt | |
| CaCO$_3$ | 18 wt. % |
| Clay | 1 wt. % |
| Solvent | 16.5 wt. % |
| mineral spirits, | |
| aromatic solvents, | |
| and combinations thereof | |
| Catalyst | <1 wt. %. |

26. The method as defined in claim 1, wherein said polyurethane pre-polymer includes by weight percent:

| | |
|---|---|
| Diisocyanate, | 10-30 wt. % |
| polyisocyanate compound, | |
| and combinations thereof | |
| Primary polyol compound | 55-90 wt. % |
| Chain extender | 0.1-12 wt. %. |

27. The method as defined in claim 1, wherein said polyurethane pre-polymer includes by weight percent:

| | |
|---|---|
| Diisocyanate, | 15-25 wt. % |
| polyisocyanate compound, | |
| and combinations thereof | |
| Primary polyol compound | 60-84.9 wt. % |
| Chain extender | 0.1-10 wt. %. |

28. The method as defined in claim 1, wherein said polyurethane pre-polymer includes by weight percent:

| | |
|---|---|
| Diisocyanate, polyisocyanate compound, and combinations thereof at least 60% MDI, TDI, and combinations thereof | 10-30 wt. % |
| Primary polyol compound at least 60% propylene glycol | 55-90 wt. % |
| Chain extender at least 60% dipropylene glycol chain extender. | 0.1-12 wt. % |

29. The method as defined in claim 1, wherein said polyurethane pre-polymer includes by weight percent:

| | |
|---|---|
| Diisocyanate, polyisocyanate compound, and combinations thereof at least 60% MDI, TDI, and combinations thereof | 15-25 wt. % |
| Primary polyol compound at least 60% propylene glycol | 60-84.9 wt. % |
| Chain extender at least 60% dipropylene glycol chain extender. | 0.1-10 wt. % |

30. The method as defined in claim 1, wherein said polyurethane pre-polymer includes by weight percent:

| | |
|---|---|
| Diisocyanate, polyisocyanate compound, and combinations thereof at least 60% MDI, TDI, and combinations thereof | 10-30 wt. % |
| Propylene Glycol Diol 1800-2200 MW | 40-70 wt. % |
| Propylene Glycol Triol 4600-5000 MW | 20-35 wt. % |
| Chain extender at least 60% dipropylene glycol chain extender. | 0.1-10 wt. % |

31. The method as defined in claim 1, wherein said polyurethane pre-polymer includes by weight percent:

| | |
|---|---|
| Diisocyanate, polyisocyanate compound, and combinations thereof at least 60% MDI, TDI, and combinations thereof | 15-20 wt. % |
| Propylene Glycol Diol 1800-2200 MW | 44-60 wt. % |
| Propylene Glycol Triol 4600-5000 MW | 25-30 wt. % |
| Chain extender at least 80% dipropylene glycol chain extender. | 2-5 wt. % |

32. The method as defined in claim 1, wherein said polyurethane pre-polymer includes by weight percent:

| | |
|---|---|
| TDI, MDI, and combinations thereof | 15-20 wt. % |
| Propylene Glycol Diol 1800-2200 MW | 45-60 wt. % |
| Propylene Glycol Triol 4600-5000 MW | 25-30 wt. % |
| Dipropylene glycol chain extender | 2-5 wt. %. |

* * * * *